US012572053B2

(12) United States Patent
Wu et al.

(10) Patent No.: US 12,572,053 B2
(45) Date of Patent: Mar. 10, 2026

(54) NOTEBOOK COMPUTER INCLUDING CAMERA MODULE SHIELD

(71) Applicant: ASUSTEK COMPUTER INC., Taipei (TW)

(72) Inventors: Ssu-Min Wu, Taipei (TW); Yen-Ting Liu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 202 days.

(21) Appl. No.: 18/226,428

(22) Filed: Jul. 26, 2023

(65) Prior Publication Data

US 2024/0302715 A1     Sep. 12, 2024

(30) Foreign Application Priority Data

Mar. 9, 2023     (TW) ................................. 112108796

(51) Int. Cl.
*G06F 1/16*          (2006.01)
*G03B 11/04*          (2021.01)

(52) U.S. Cl.
CPC .......... *G03B 11/043* (2013.01); *G06F 1/1686* (2013.01)

(58) Field of Classification Search
CPC .................................................... G03B 11/043
See application file for complete search history.

(56) References Cited

U.S. PATENT DOCUMENTS

| | | | | | |
|---|---|---|---|---|---|
| 2,702,468 | A | * | 2/1955 | Spain | E05B 17/185 |
| | | | | | 70/455 |
| D706,327 | S | * | 6/2014 | Warr | E05B 17/185 |
| | | | | | D16/130 |
| 8,897,005 | B2 | * | 11/2014 | Huang | H05K 7/16 |
| | | | | | 361/679.01 |
| 10,969,558 | B2 | * | 4/2021 | Deng | G02B 7/00 |
| 11,422,433 | B2 | * | 8/2022 | Abe | G03B 9/36 |
| 2010/0102979 | A1 | * | 4/2010 | Huang | G06F 1/1616 |
| | | | | | 361/679.57 |
| 2011/0058255 | A1 | * | 3/2011 | Weiss | H04N 23/50 |
| | | | | | 359/511 |
| 2011/0182029 | A1 | * | 7/2011 | Wu | G06F 1/1686 |
| | | | | | 361/679.55 |

(Continued)

FOREIGN PATENT DOCUMENTS

| | | |
|---|---|---|
| CN | 209215986 U | 8/2019 |
| CN | 114040078 A | 2/2022 |

*Primary Examiner* — Abhishek M Rathod
(74) *Attorney, Agent, or Firm* — MUNCY, GEISSLER, OLDS & LOWE, P.C.

(57)     ABSTRACT

A notebook computer is disclosed. The notebook computer includes a screen and a host. The screen includes a housing with a frame and a back cover, a camera module, and a shield. The back cover is connected to the frame and a side wall is formed adjacent to a junction of the back cover and the frame. The frame is provided with a first opening and the side wall is provided with a second opening. The camera module is arranged in the housing and includes a lens facing the first opening. The shield includes a shielding portion and an operating portion. The shielding portion is arranged in the housing and located between the lens and the first opening. The operating portion is movably arranged in the second opening and linked to the shielding portion to drive the shielding portion to move between an opening position and a shielding portion.

7 Claims, 9 Drawing Sheets

(56)     References Cited

U.S. PATENT DOCUMENTS

2018/0004068 A1*   1/2018   Chen ..................... G06F 1/1605
2018/0059510 A1*   3/2018   Gustaveson ......... G03B 11/043
2019/0033686 A1*   1/2019   Kinoshita ............ G03B 11/043
2020/0196142 A1*   6/2020   Yang ..................... H04W 12/02
2021/0149272 A1*   5/2021   Li .......................... H04N 23/55
2021/0208479 A1*   7/2021   Clark .................... H04N 23/51
2021/0360805 A1*   11/2021   Wang ................... H05K 5/0217
2023/0014680 A1*   1/2023   Sprenger .............. G06F 1/3215

* cited by examiner

NOTEBOOK COMPUTER INCLUDING CAMERA MODULE SHIELD

CROSS-REFERENCE TO RELATED APPLICATION

This application claims the priority benefit of Taiwan application serial No. 112108796, filed on Mar. 9, 2023. The entirety of the above-mentioned patent application is hereby incorporated by reference herein and made a part of the specification.

BACKGROUND OF THE INVENTION

Field of the Invention

The disclosure relates to an electronic device, and in particular, to a notebook computer.

Description of the Related Art

With the development of electronic technologies, notebook computers have become essential electronic products in life. The notebook computers are generally configured with a camera lens for users to have a video chat or a video conference. However, the configuration of the camera lens is also easy to lead to leakage of privacy.

BRIEF SUMMARY OF THE INVENTION

The disclosure provides a notebook computer. The notebook computer includes a screen and a host. The screen includes a housing, a camera module, and a shield. The housing includes a frame and a back cover. The back cover is connected to the frame and a side wall is formed adjacent to a junction of the back cover and the frame. The frame is provided with a first opening and the side wall is provided with a second opening. The camera module is arranged in the housing and includes a lens facing the first opening. The shield includes a shielding portion and an operating portion. The shielding portion is arranged in the housing and located between the lens and the first opening. The operating portion is movably arranged in the second opening and linked to the shielding portion to drive the shielding portion to move between an opening position and a shielding position.

In the notebook computer provided in the disclosure, the operating portion of the shield is moved to the side wall of the housing of the screen without forming an additional hole in the frame of the screen, to ensure the integrity of the appearance of the frame.

DETAILED DESCRIPTION OF THE EMBODIMENTS

Specific implementations of the disclosure are described in more detail below with reference to the schematic drawings. Features and advantages of the disclosure are becoming more obvious according to the following descriptions and claims. It is worth noting that the drawings are drawn by using an extremely simplified form and an imprecise proportion, which are only used for conveniently and clearly assisting in explaining the objective of the embodiments of the disclosure.

Figure 1A:
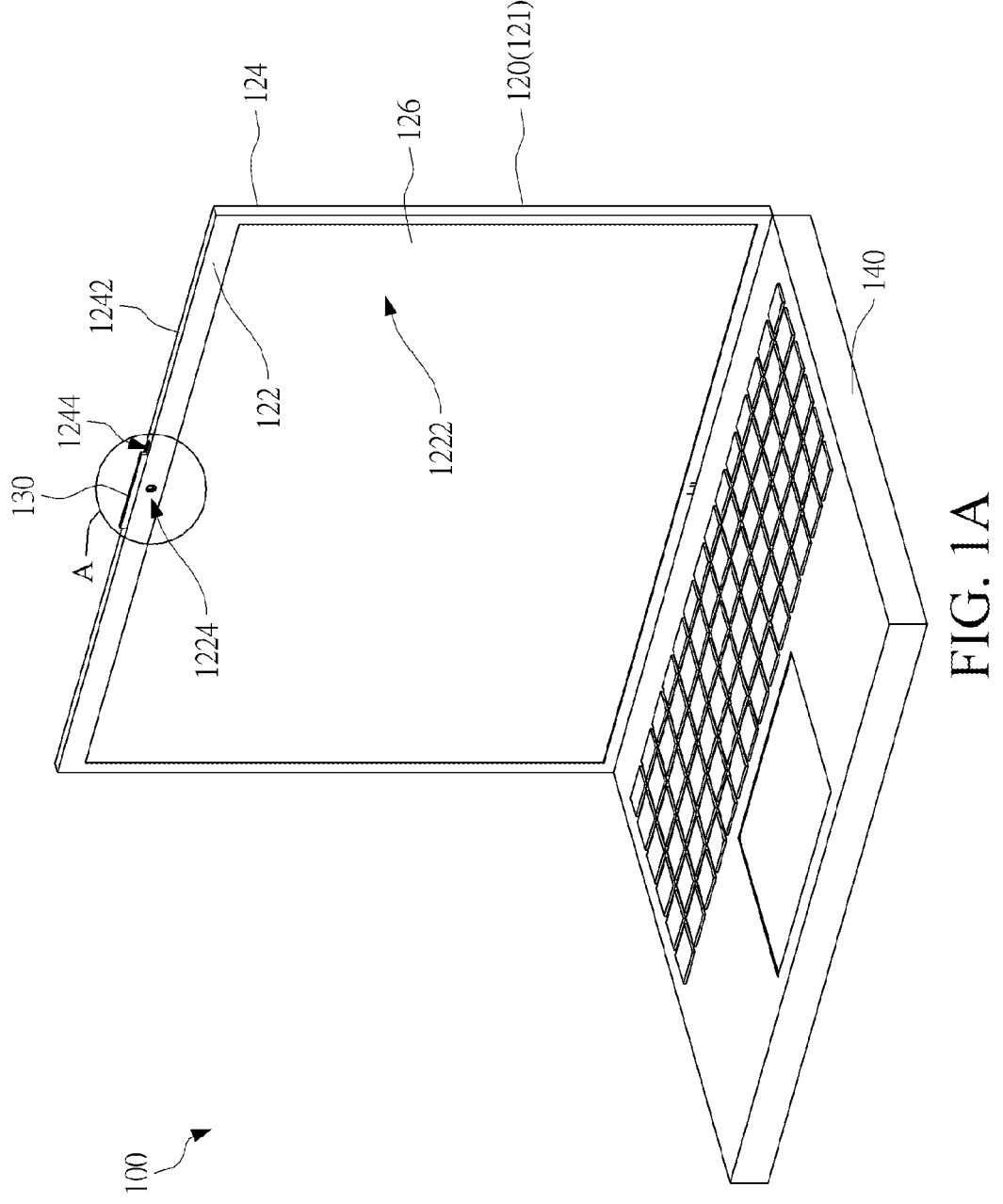
FIG. 1A and FIG. 1B are a schematic views of a first embodiment of a notebook computer according to the disclosure.
Figure 1B:
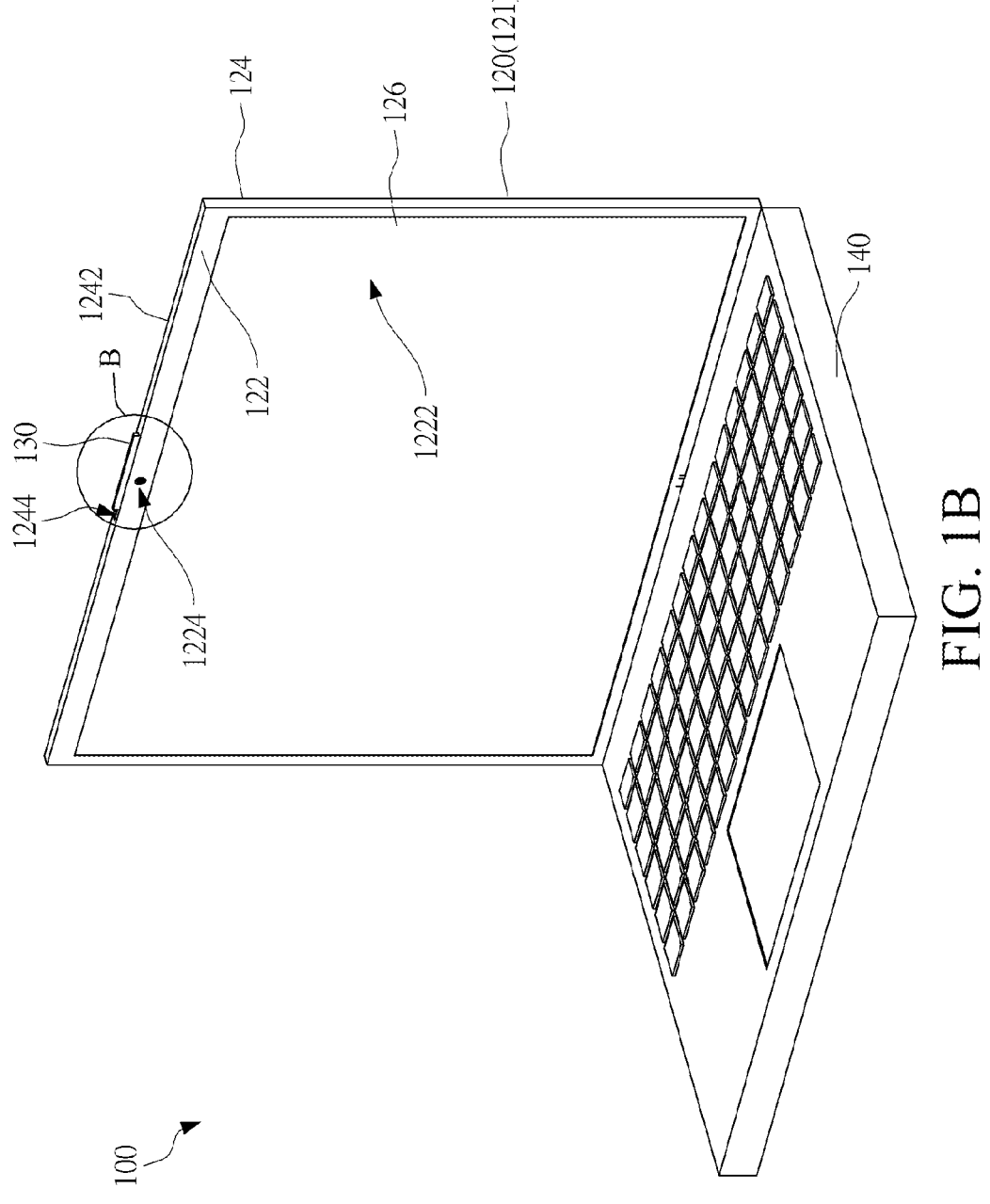
Figure 2A:
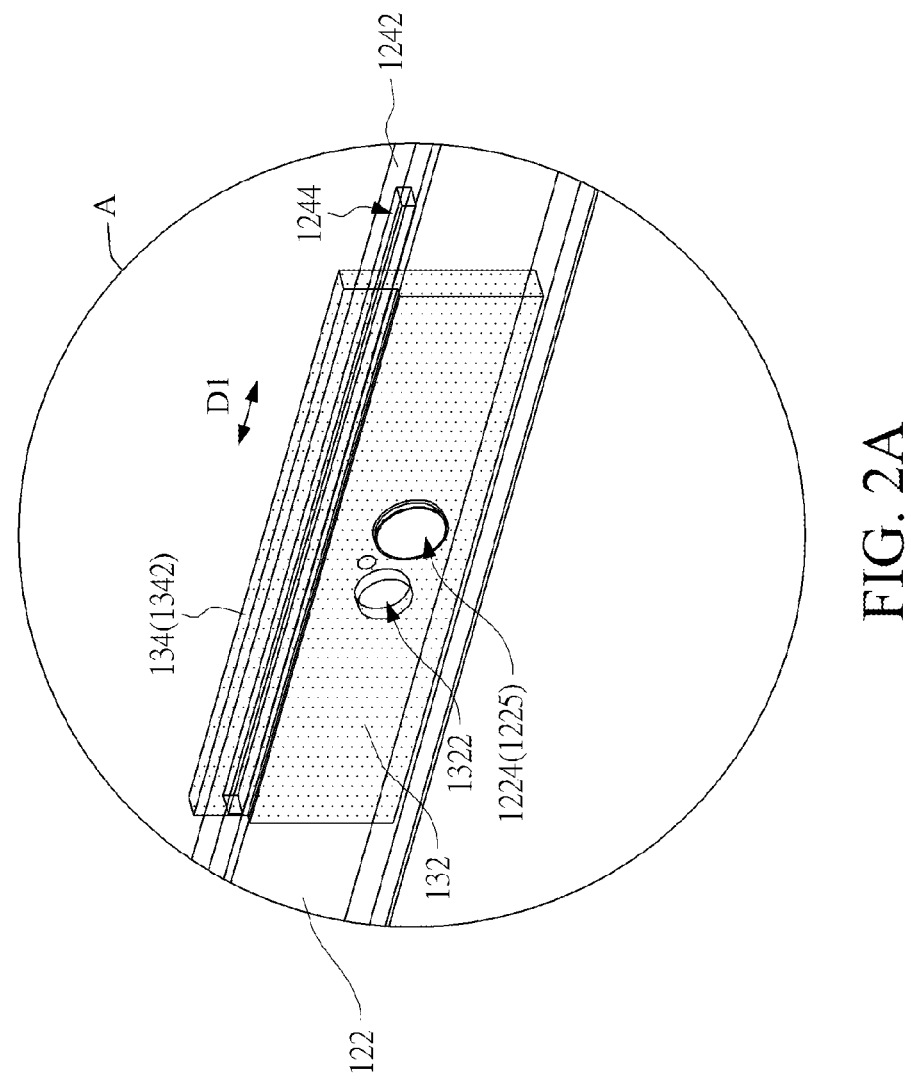
FIG. 2A shows an enlarged area A in FIG. 1A.
Figure 2B:
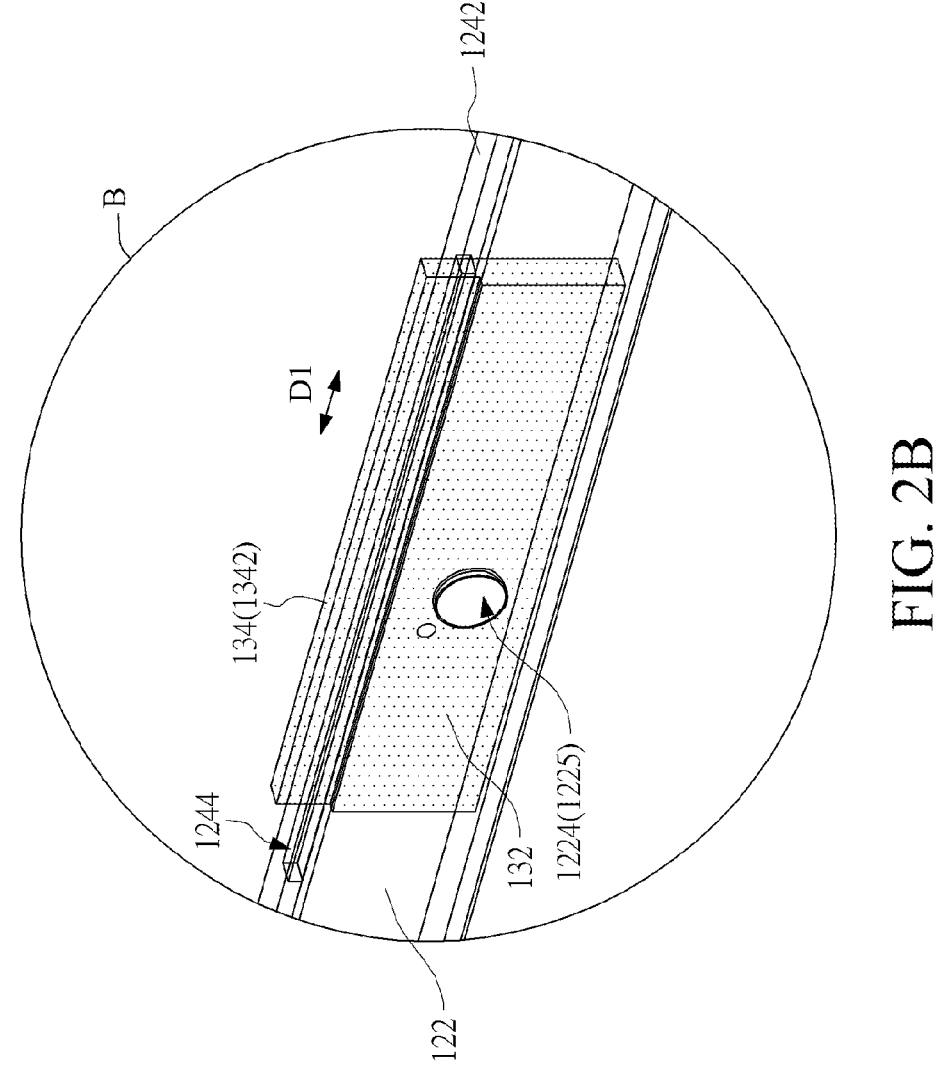
FIG. 2B shows an enlarged area B in FIG. 1B.
Figure 3:
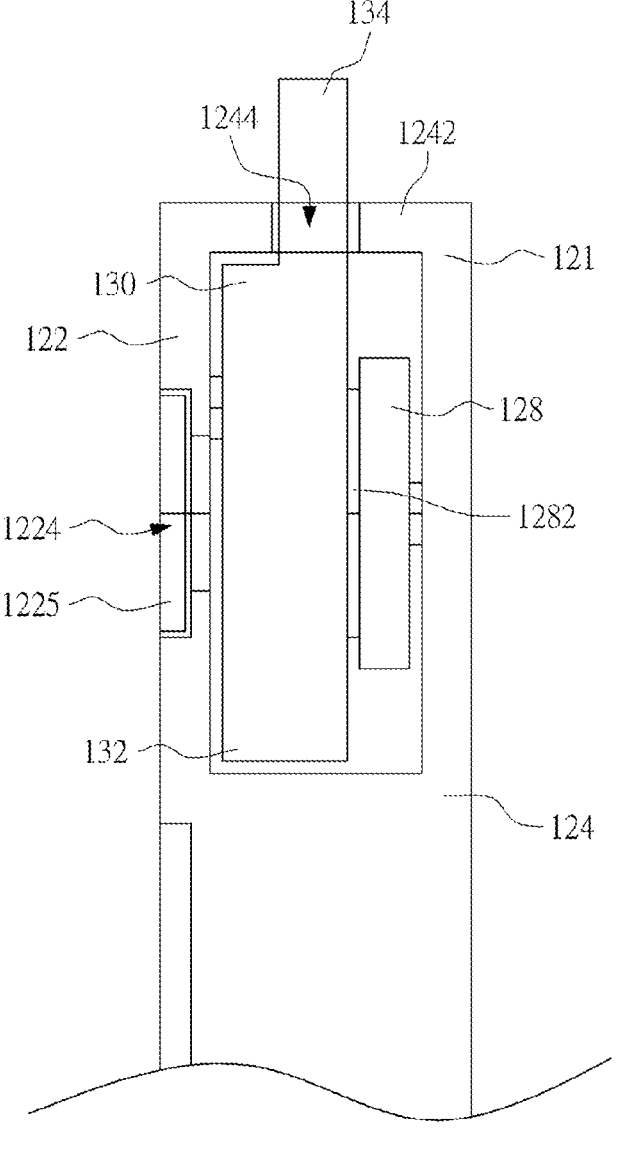
FIG. 3 is a side view corresponding to FIG. 2A.

FIG. 1A and FIG. 1B are schematic views of a first embodiment of a notebook computer 100 according to the disclosure. An outer shell of a screen 120 shown in the figures is drawn in a perspective way to show an inner structure thereof. A shield in FIG. 1A is closed and a shield in FIG. 1B is opened. FIG. 2A shows an enlarged area A in FIG. 1A, and FIG. 2B shows an enlarged area B in FIG. 1B. FIG. 3 is a side view corresponding to FIG. 2A.

As shown in FIG. 1A and FIG. 1B, the notebook computer 100 in this embodiment includes a screen 120 and a host 140. A lower edge of the screen 120 is pivotally connected to the host 140. The screen 120 includes a housing 121. The housing 121 includes a frame 122 and a back cover 124. The back cover 124 is connected to the frame 122 and a side wall 1242 is formed adjacent to a junction of the back cover 124 and the frame 122. The frame 122 covers a front side of the back cover 124 to form a space to accommodate a display panel 126. A center of the frame 122 is provided with a square opening 1222 that corresponds to a display area of the display panel 126.

Referring to FIG. 2A and FIG. 2B together, the frame 122 close to an upper edge of the screen 120 is provided with a first opening 1224. The side wall 1242 on the upper edge of the screen 120 is provided with a second opening 1244. In an embodiment, a lens 1225 is arranged in the first opening 1224.

In an embodiment, the first opening 1224 is located in a middle position of the frame 122 close to the upper edge of the screen 120 and the second opening 1244 is located in a middle position of the side wall 1242 close to the upper edge of the screen 120.

Referring to FIG. 3 together, FIG. 3 is a side view corresponding to FIG. 2A. As shown in the figure, the screen 120 includes a camera module 128 and a shield 130. The camera module 128 is arranged in the housing 121, and includes a lens 1282 facing the first opening 1224. The shield 130 includes a shielding portion 132 and an operating portion 134. The shielding portion 132 is arranged in the housing 121 and located between the lens 1282 and the first opening 1224.

Referring to FIG. 2A and FIG. 2B again, the operating portion 134 is movably arranged in the second opening 1244 and linked to the shielding portion 132 to drive the shielding portion 132 to move between an opening position (corresponding to the position shown in FIG. 2B) and a shielding position (corresponding to the position shown in FIG. 2A).

In an embodiment, as shown in the figure, the first opening is a circular opening and the second opening 1244 is a long opening. The operating portion 134 slips fit in the second opening 1244 along a first direction D1 (a long side direction of the long opening) and drives the shielding portion 132 to move between the opening position and the shielding position along the first direction D1. In this embodiment, the first direction D1 is parallel to a width direction of the screen 120. In other embodiments, the first direction D1 is parallel to a height direction of the screen 120 or a thickness direction of the screen 120.

The shielding portion 132 in this embodiment is plate-like and provided with a circular hole 1322. The operating portion 134 and the shielding portion 132 are integrally formed. As shown in FIG. 2B, when the operating portion 134 drives the shielding portion 132 to move to the opening position, the circular hole 1322 is aligned with the first opening 1224, and the lens 1282 of the camera module 128 receives an external image through the circular hole 1322 and the first opening 1224. As shown in FIG. 2A, when the operating portion 134 drives the shielding portion 132 to move to the shielding position, the circular hole 1322 on the shielding portion 132 deviates from the first opening 1224 to keep out light from the outside.

In an embodiment, as shown in FIG. 2A and FIG. 2B, the operating portion 134 includes a long structure 1342 that protrudes from the side wall 1242 through the second opening 1244. In addition to being a position for users to operate and control the shielding portion 132, the long structure 1342 serves as a force applying portion for users to open or close the screen 120.

In an embodiment, an outer side surface of the frame 122 has a first color and a surface of the shielding portion 132 away from the lens 1282 has a second color. The first color is different from the second color and the second color is different from a color of the lens 1282. In this way, users clearly recognize whether the shield 130 is opened or closed through the color shown at the first opening.

Figure 4A:
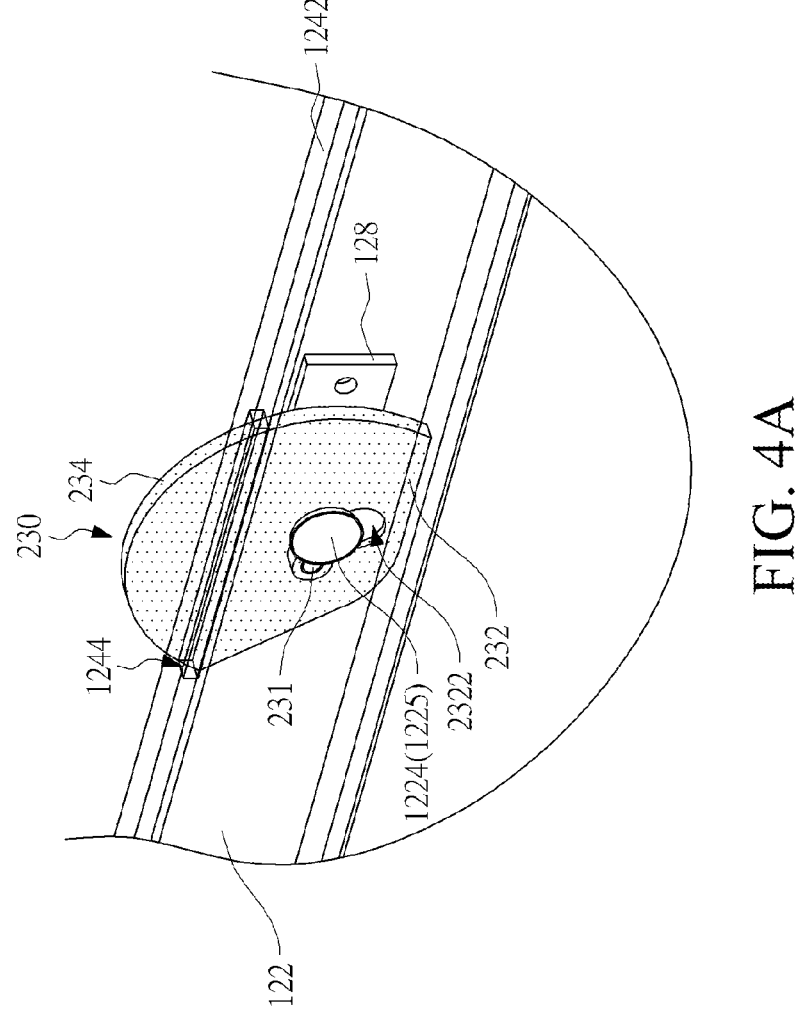
FIG. 4A and FIG. 4B are schematic partial views of a second embodiment of the notebook computer according to the disclosure.
Figure 4B:
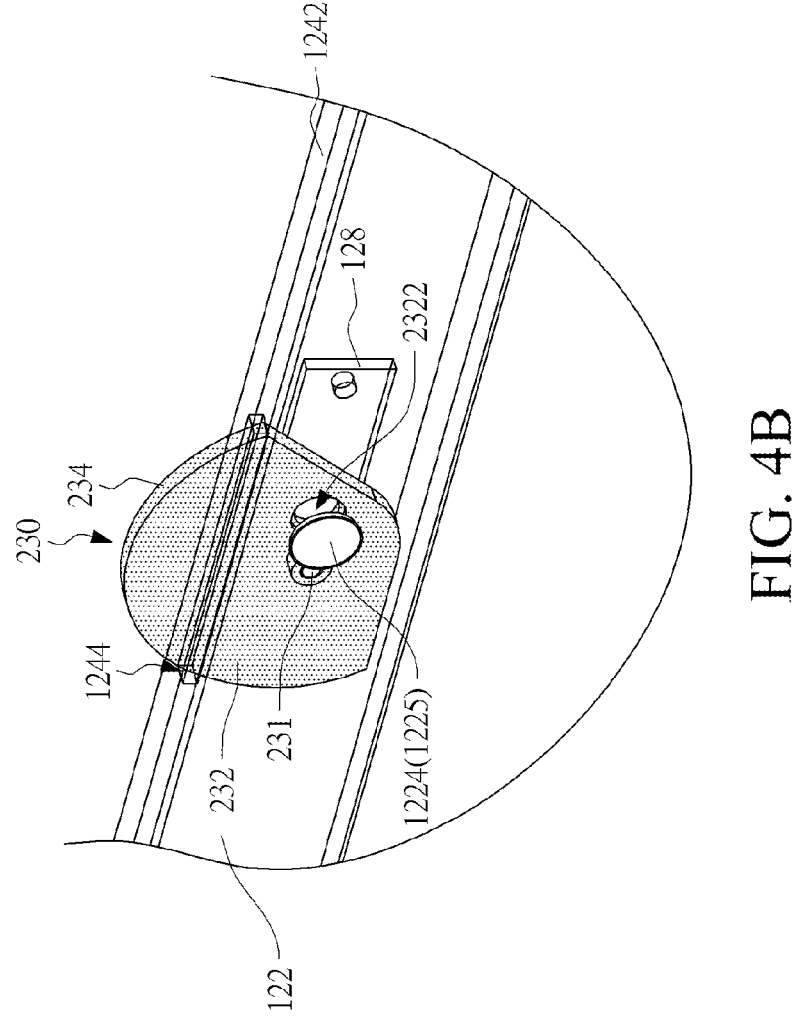

FIG. 4A and FIG. 4B are schematic partial views of a second embodiment of the notebook computer according to the disclosure. An outer shell of the screen 120 shown in the figures is drawn in a perspective way to show an inner structure thereof.

A main difference between this embodiment and the first embodiment is a design of a shield 230. As shown in the figures, the shield 230 includes a pivot 231 pivotally connected to the housing 121. The shield 230 is in a disc-like structure, and includes a shielding portion 232 and an operating portion 234 on two opposite sides of the pivot 231. The operating portion 234 fans out for users to operate. The shielding portion is provided with a circular hole 2322. Driven by the operating portion 234, the shielding portion 232 moves in a rotation mode between the opening position (corresponding to the position shown in FIG. 4B) and the shielding position (corresponding to the position shown in FIG. 4A).

Figure 5A:
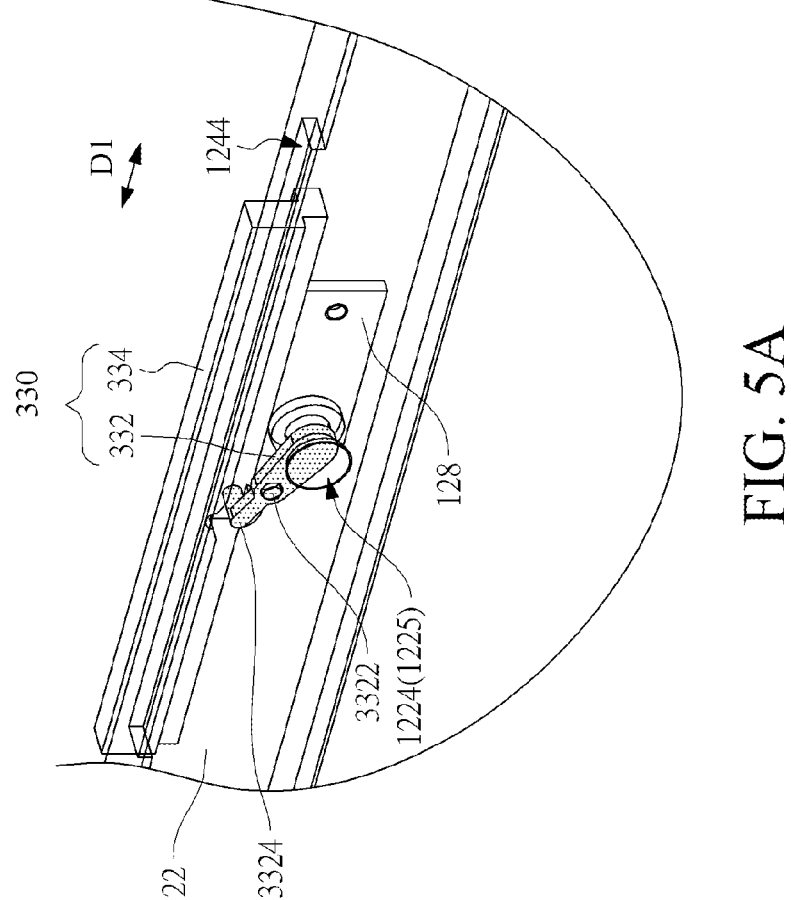
FIG. 5A and FIG. 5B are schematic partial views of a third embodiment of the notebook computer according to the disclosure.
Figure 5B:
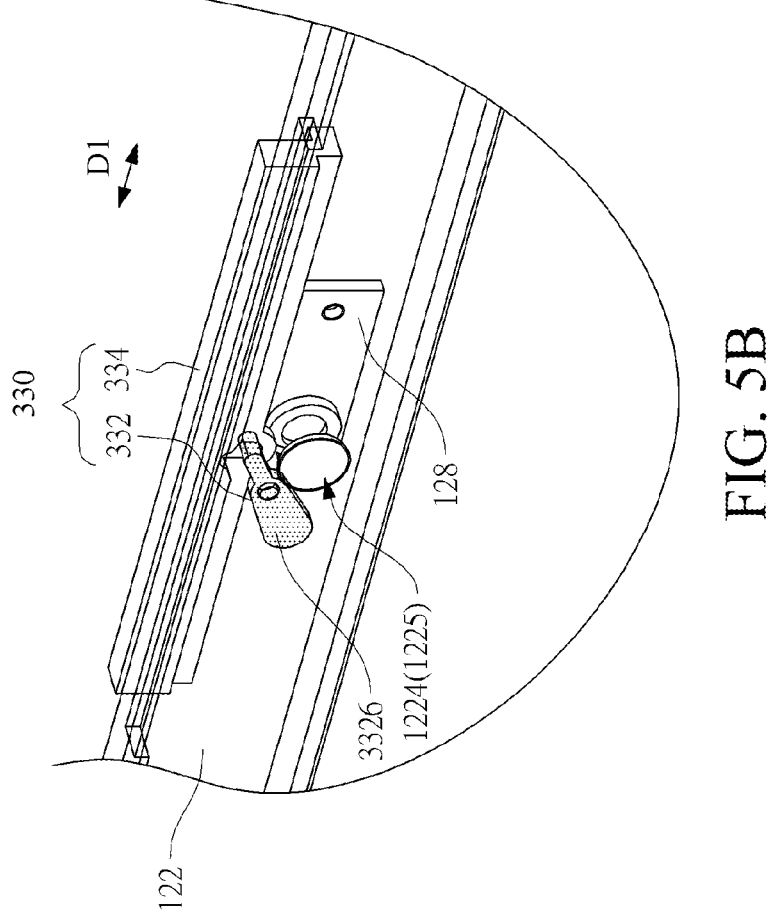

FIG. 5A and FIG. 5B are schematic diagrams of a third embodiment of the notebook computer according to the disclosure. An outer shell of the screen 120 shown in the figures is drawn in a perspective way to show an inner structure thereof.

A main difference between this embodiment and the first embodiment is a design of a shield 330. Different from first embodiment in which the shielding portion 132 and the operating portion 134 are integrally formed, a shielding portion 332 and an operating portion 334 in this embodiment are two independent components. The operating portion 334 slips fit in the second opening 1244 along a first direction D1. The shielding portion moves in a rotation mode.

The shielding portion 332 includes a pivot 3322, a connection end 3324, and a shield end 3326. The pivot 3322 is pivotally connected to the housing 121. The connection end 3324 and the shield end 3326 are located on two opposite sides of the pivot 3322. The connection end 3324 is coupled to the operating portion 334 and the shield end 3326 is used to shield the first opening 1224.

Driven by the operating portion 334, the shielding portion 332 moves in a rotation mode between the opening position (corresponding to the position shown in FIG. 5B) and the shielding position (corresponding to the position shown in FIG. 5A).

In the notebook computer 100 provided in the disclosure, the operating portions 134, 234, and 334 of the shield 130, 230, and 330 are moved to the side wall 1242 of the housing 121 of the screen 120 as handles for users to open or close the screen 120 without forming an additional hole in the frame 122 of the screen 120, to ensure the integrity of the appearance of the frame 122.

The foregoing descriptions are merely preferred embodiments of the disclosure, and do not limit the disclosure. Any form of equivalent replacement or modification made by a person skilled in the art to the technical means and technical content disclosed in the disclosure without departing from the scope of the technical means of the disclosure falls within the scope of the claims of the disclosure without departing from the content of the technical means of the disclosure.

What is claimed is:

1. A notebook computer, comprising:
   a screen, comprising:
      a housing, comprising a frame and a back cover, wherein the back cover is connected to the frame and a side wall is formed adjacent to a junction of the back cover and the frame, the frame is provided with a first opening, and the side wall is provided with a second opening;
      a camera module, arranged in the housing and comprising a lens facing the first opening; and
      a shield, comprising a shielding portion and an operating portion, wherein the shielding portion is arranged in the housing and located between the lens and first opening, and the operating portion is movably arranged in the second opening and linked to the shielding portion to drive the shielding portion to move between an opening position and a shielding position; and
   a host, pivotally connected to the screen,
   wherein the shield comprises a pivot pivotally connected to the housing, and the shielding portion and the operating portion are located on two opposite sides of the pivot,
   wherein the shield is in a disc-like structure, and
   wherein the shield is sector-shaped, the pivot is located at the sector-shaped shield, the operating portion is at a circular edge of the sector-shaped shield, the operating portion is at least partially exposed through the second opening, and the shielding portion is adjacent to a linear edge of the sector-shaped shield.

2. The notebook computer according to claim 1, wherein the shielding portion and the operating portion are integrally formed.

3. The notebook computer according to claim 1, wherein the shielding portion comprises a circular hole, and the circular hole is aligned with the first opening when the shielding portion is at the opening position.

4. The notebook computer according to claim 1, wherein the operating portion is movably arranged in the second opening along a first direction.

5. The notebook computer according to claim 1, wherein the shielding portion moves in a rotation mode between the opening position and the shielding position.

6. The notebook computer according to claim 1, wherein the frame has a first color, the shielding portion has a second color, and the second color is different from the first color.

7. The notebook computer according to claim 1, wherein the operating portion protrudes from the side wall through the second opening.

* * * * *